US008926793B2

(12) United States Patent
Goto et al.

(10) Patent No.: US 8,926,793 B2
(45) Date of Patent: Jan. 6, 2015

(54) PROCESSES FOR PREPARING PULP AND PAPER

(75) Inventors: Shisei Goto, Tokyo (JP); Takaharu Noda, Tokyo (JP); Hiroki Ohtake, Tokyo (JP); Tatsumi Hosaka, Hokkaido (JP)

(73) Assignees: Nippon Paper Industries Co., Ltd., Tokyo (JP); Aikawa Iron Works Co., Ltd., Shizuoka (JP)

( * ) Notice: Subject to any disclaimer, the term of this patent is extended or adjusted under 35 U.S.C. 154(b) by 0 days.

(21) Appl. No.: 14/008,239

(22) PCT Filed: Jan. 24, 2012

(86) PCT No.: PCT/JP2012/051383
§ 371 (c)(1),
(2), (4) Date: Sep. 27, 2013

(87) PCT Pub. No.: WO2012/132513
PCT Pub. Date: Oct. 4, 2012

(65) Prior Publication Data
US 2014/0020856 A1    Jan. 23, 2014

(30) Foreign Application Priority Data

Mar. 31, 2011 (JP) ................................. 2011-077950

(51) Int. Cl.
| | | |
|---|---|---|
| *D21H 11/14* | (2006.01) | |
| *D21C 5/02* | (2006.01) | |
| *D21D 1/00* | (2006.01) | |
| *D21D 5/02* | (2006.01) | |
| *D21D 99/00* | (2006.01) | |
| *D21H 15/02* | (2006.01) | |

(52) U.S. Cl.
CPC *D21C 5/025* (2013.01); *D21D 5/02* (2013.01); *D21D 99/00* (2013.01); *D21H 11/14* (2013.01); *D21C 5/02* (2013.01); *D21H 15/02* (2013.01)
USPC ............... 162/4; 162/55; 162/147; 162/149; 210/702; 241/21; 241/28

(58) Field of Classification Search
CPC ........... D21C 5/02; D21C 5/025; D21D 5/02; D21D 1/20; D21D 99/00; D21F 1/66; Y10S 210/928; D21H 11/14
USPC ..................... 162/4, 55–56, 5, 141, 147, 149; 209/12.1, 16–17, 233, 240, 252–253, 209/346; 210/702–706; 241/20–21, 28; 510/174
See application file for complete search history.

(56) References Cited

U.S. PATENT DOCUMENTS

| | | | | |
|---|---|---|---|---|
| 4,915,821 | A | * | 4/1990 | Lamort ........................... 209/17 |
| 4,999,084 | A | * | 3/1991 | Lang et al. ....................... 162/4 |
| 5,472,095 | A | | 12/1995 | Malm |
| 5,503,709 | A | * | 4/1996 | Burton ............................ 162/6 |
| 6,290,811 | B1 | * | 9/2001 | Ryu et al. ......................... 162/4 |
| 6,517,680 | B1 | * | 2/2003 | Fredlund et al. ............. 162/198 |
| 7,168,570 | B2 | * | 1/2007 | Frejborg ....................... 209/283 |
| 8,043,473 | B2 | * | 10/2011 | Yuzawa et al. .................... 162/4 |
| 2004/0084366 | A1 | * | 5/2004 | Anderson et al. ............. 210/603 |
| 2004/0256065 | A1 | * | 12/2004 | Ahmed et al. .................. 162/26 |
| 2006/0254732 | A1 | | 11/2006 | Dockal-Baur et al. |
| 2007/0137804 | A1 | | 6/2007 | Goto et al. |
| 2010/0059190 | A1 | * | 3/2010 | Katajamaki et al. .......... 162/129 |
| 2010/0147479 | A1 | | 6/2010 | Goto et al. |
| 2014/0020856 | A1 | * | 1/2014 | Goto et al. ........................ 162/4 |

FOREIGN PATENT DOCUMENTS

| | | | |
|---|---|---|---|
| EP | 624684 A1 | * | 11/1994 |
| JP | 04-146283 | | 5/1992 |
| JP | 07-300784 | | 11/1995 |
| JP | 08-260372 | | 10/1996 |
| JP | 2986525 | | 10/1999 |
| JP | 2004-131892 | | 4/2004 |
| JP | 2004-169213 | | 6/2004 |
| JP | 2006-316400 | | 11/2006 |
| JP | 2012149362 A | * | 8/2012 |
| JP | 2012214953 A | * | 11/2012 |
| WO | 2005/012632 | | 2/2005 |

OTHER PUBLICATIONS

Machine Translation of JP 08-260372, published on 1996.*
International Search Report for PCT/JP2012/051383 dated Apr. 24, 2012.
English Translation of International Preliminary Report on Patentability for PCT/JP2012/051383, dated Oct. 9, 2013.
International Preliminary Report on Patentability for PCT/JP2012/051383, dated Sep. 30, 2013.

* cited by examiner

*Primary Examiner* — Jose Fortuna
(74) *Attorney, Agent, or Firm* — Roylance, Abrams, Berdo & Goodman, L.L.P.

(57) ABSTRACT

The purpose of the present invention is to provide technology for regenerating pulp having high quality with compact pulp regenerating equipment and less energy.
In the pulp regenerating method of the present invention, pulp slurry containing 1.5 wt % or more of a solid component including waste paper pulp is separated into a long fiber fraction and a short fiber fraction by using an outward type slit screen including an opening portion having a slit width in the range of 0.1 mm to 0.3 mm. The solid component ratio of the long fiber fraction and the short fiber fraction is in the range from 10:90 to 60:40, and the difference in Canadian Standard Freeness of the long fiber fraction and the short fiber fraction is in the range of 100 ml to 300 ml.

13 Claims, 1 Drawing Sheet

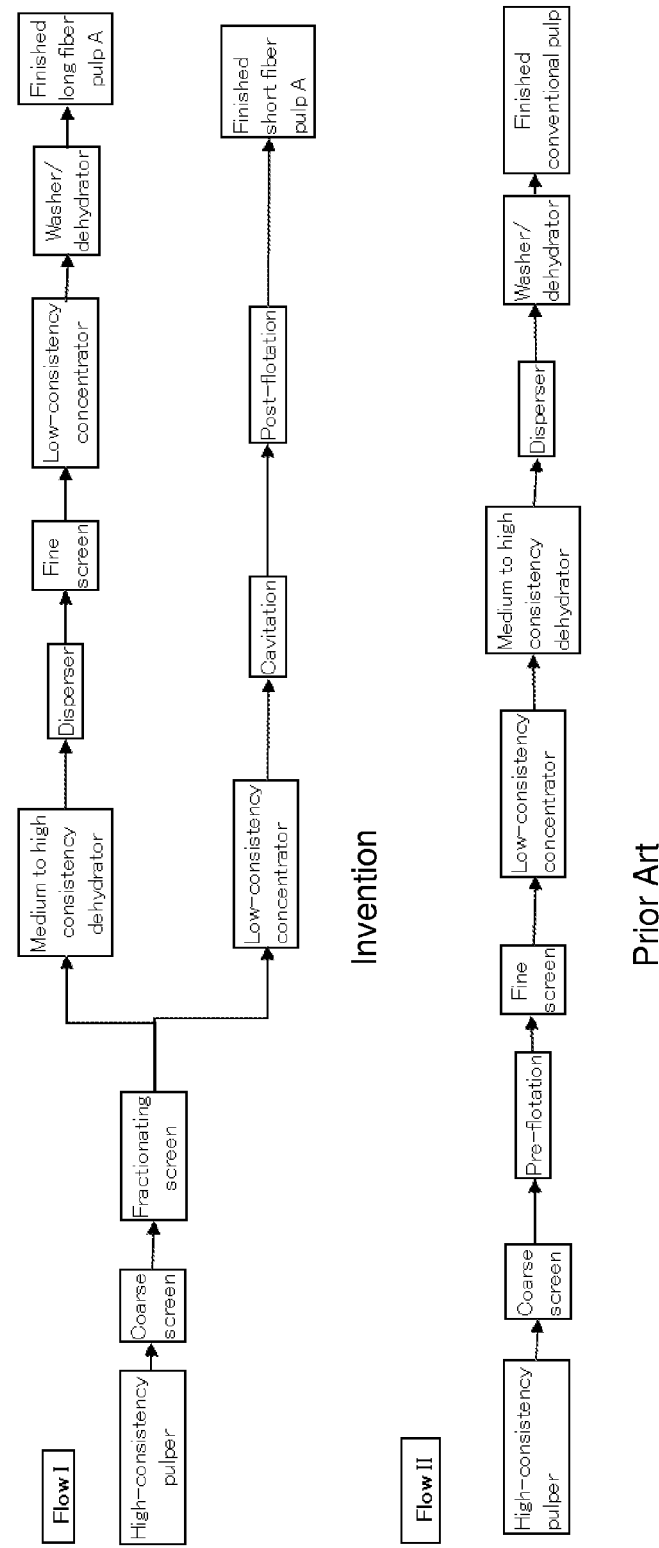

PROCESSES FOR PREPARING PULP AND PAPER

TECHNICAL FIELD

The present invention relates to processes for preparing pulp and paper. The present invention relates to techniques for efficiently preparing recycled pulp by fractionating a pulp slurry into a long fiber fraction relatively rich in long fibers and a short fiber fraction relatively rich in fines in the production process of the recycled pulp. The present invention also relates to processes for effectively preparing high-quality recycled pulp by subjecting each fraction to a suitable treatment for it. Further, the present invention relates to processes for preparing paper by incorporating the recycled pulp thus obtained.

BACKGROUND ART

To prepare recycled pulp from waste paper at low cost, inks and adhesive contaminants contained in the waste paper must be efficiently removed from fibers. Typically, inks are removed by washing or flotation after treating fibers with a mechanical ink-detachment machine to promote stripping of the inks because the inks stick to the fibers and ash. As to adhesive contaminants, it is known that they are most effectively removed by treating a low-consistency pulp slurry using a screen having a narrow slit width.

On the other hand, the recent diversification of prints has led to the frequent use of hard-to remove inks such as UV inks and varnish as well as the frequent inclusion of adhesive contaminants derived from adhesive labels or adhesive tapes, which tends to degrade the quality of recycled pulp. To compensate for such decline in quality, production processes of recycled pulp tend to involve heavier facilities, which invites problems such as yield losses and increase in electric power cost.

In view of the decline in the quality of raw materials, it was difficult to prepare recycled pulp at low cost while maintaining its quality at the same time. Attempts were made to solve such problems by applying fiber fractionation to production processes of recycled pulp and separately treating the resulting fractions to incorporate them into paper.

Japanese Patent No. 2986525 proposes a method for obtaining recycled pulp by fractionating fibers into a long fiber fraction and a short fiber fraction using an inward flow screen, treating the long fiber fraction by a fine screening process and the short fiber fraction by flotation, then combining both fractions and treating them with a cleaner followed by dehydration. This method is said to be advantageous in that the facility can be downsized by subjecting the long fiber fraction to no flotation. However, this method had the disadvantages that it requires a large screen to fractionate fibers at low consistency of approximately 1% because it uses an inward flow screen liable to be clogged with raw materials and that if one intends to remove inks during the flotation process of the short fiber fraction rich in inks, the flotation yield decreases, but if one intends to maintain a good yield, ink removal is not promoted and brightness decreases because the inks stick to fines and ash.

JPA2004-131892 proposes a method comprising defibering unsorted waste paper and treating it through a coarse screen followed by flotation, and then fractionating the resulting suspension using a screen having a slit width of 0.05 to 0.12 mm. This method required a large flotation facility to treat a large volume because fractionation is preceded by flotation. For example, 4 tons/hour or more of solids must be treated to obtain 100 BD tons/day of recycled pulp, which means that a large flotation facility capable of treating a slurry at 400 tons/hour or more is required in the case of flotation at a consistency of approximately 1% by weight known to ensure a good flotation efficiency.

JPA2006-316400 proposes a method comprising fractionating a pulp into a fine fraction and a coarse fraction using a pressure sorter, screw press or hydrocyclone, and separately subjecting both fractions to flotation under different conditions. However, this method had the disadvantages that when a screw press is used, fractionation conditions are difficult to control, and that when a hydrocyclone is used, separation takes place at low consistency so that the separation efficiency is poor despite a large facility involving high energy consumption. This method also had the disadvantage that when a pressure sorter is used, the yield decreases and the cost increases because both fractions are subjected to flotation most responsible for yield losses in the production process of recycled pulp. Further, this method had the disadvantage that the ink separation efficiency is too low to avoid yield losses if one intends to attain good brightness because the fine fraction is subjected to flotation at higher consistency than the coarse fraction without any means for separating inks sticking to fines and ash in the fine fraction from these fines and ash, similarly to patent document 1.

SUMMARY OF INVENTION

Technical Problem

The present invention aims to overcome the disadvantages associated with known techniques and to provide techniques for preparing high-quality recycled pulp while downsizing the production facility of the recycled pulp and achieving energy saving by fractionating a pulp slurry containing waste paper pulp into a long fiber fraction and a short fiber fraction by a specific method and subjecting each fraction to a suitable treatment for it in the production process of the recycled pulp.

Solution to Problem

The present invention allows recycled pulp to be efficiently prepared by fractionating a pulp slurry of defibered waste paper at such a high consistency as a solids content of 1.5% by weight or more into a long fiber fraction and a short fiber fraction using an outward flow slit screen in the production process of the recycled pulp. Further, the recycled pulp can be obtained very efficiently by subjecting the long fiber fraction to an ink detachment step and a contaminant removal step using a screen and the short fiber fraction to an ink removal step.

The present invention includes, but not limited to, the following aspects:

(1) A process for preparing recycled pulp, comprising fractionating a pulp slurry having a solids content of 1.5% by weight or more containing waste paper pulp into a long fiber fraction and a short fiber fraction using an outward flow slit screen having openings with a slit width of 0.1 mm to 0.3 mm, wherein the solids content ratio of the long fiber fraction to the short fiber fraction is 10:90 to 60:40 and wherein the difference in Canadian standard freeness between the long fiber fraction and the short fiber fraction is 100 ml to 300 ml.

(2) The process as defined in (1) wherein the recycled pulp is obtained by subjecting the long fiber fraction to an ink detachment step and a contaminant removal step.

(3) The process as defined in (1) or (2) wherein the long fiber fraction has a solids content of 2.0% by weight or more immediately after fractionation, and wherein the fraction is dehydrated to a solids content of 25% by weight or more and then subjected to the ink detachment step and the contaminant removal step at a solids content of 0.5 to 1.2% by weight using a screen having a slit width of 0.1 to 0.2 mm.

(4) The process as defined in any one of (1) to (3) wherein the long fiber fraction is not subjected to an ink removal step by flotation.

(5) The process as defined in any one of (1) to (4) wherein the recycled pulp is obtained by subjecting the short fiber fraction to an ink removal step.

(6) The process as defined in (5) wherein the short fiber fraction is subjected to an ink detachment step at a solids content of 5% or less and then subjected to the ink removal step.

(7) The process as defined in (6) wherein the ink detachment step comprises bringing cavitation bubbles into contact with the pulp.

(8) The process as defined in any one of (1) to (7) wherein the short fiber fraction is not subjected to a contaminant removal step using a screen.

(9) A process for preparing paper comprising incorporating a long fiber pulp and/or a short fiber pulp obtained by the process as defined in any one of (1) to (8) into the paper separately or as a mixture in any ratio.

Advantageous Effects of Invention

According to the present invention, a pulp slurry of defibered waste paper having a relatively high consistency can be efficiently fractionated by using a specific screen without diluting the pulp slurry to a solids content of approximately 1% by weight as conventionally. Further, the electric power and water consumed in the facility can be reduced because the facility is downsized as compared with those of existing production processes of recycled pulp by separately subjecting the long fiber fraction and the short fiber fraction thus obtained to optimal treatments and omitting unnecessary treatments. According to the present invention, long fibers can be subjected to treatments such as dehydration and bleaching after fines have been removed from them, whereby the treatment efficiency of recycled pulp also improves, which leads to reduction of chemicals such as bleaching chemicals. According to the present invention as defined above, recycled pulp can be prepared with comparable or higher quality at lower cost as compared with conventional techniques and the resulting recycled pulp can be further used to efficiently prepare high-quality paper.

BRIEF DESCRIPTION OF DRAWINGS

FIG. 1 is a diagram showing an embodiment of a flow chart of a pulp treatment process (Flow I: Examples, Flow II: Comparative example).

DESCRIPTION OF EMBODIMENTS

The processes for preparing recycled pulp according to the present invention comprise fractionating a pulp slurry having a solids content of 1.5% by weight or more containing waste paper pulp into a long fiber fraction and a short fiber fraction using an outward flow slit screen having openings with a slit width of 0.1 mm to 0.3 mm, wherein the solids content ratio of the long fiber fraction to the short fiber fraction is 10:90 to 60:40 and wherein the difference in Canadian standard freeness between the long fiber fraction and the short fiber fraction is 100 ml to 300 ml.

(Recycled Pulp)

As used herein, the term "recycled pulp" refers to pulp recycled from waste paper and includes waste paper pulp obtained by defibering waste paper and deinked pulp obtained by defibering waste paper and then removing inks. Waste papers used as raw materials include, for example, newspapers, advertising leaflets, magazines, books, waste office papers, sealed letters, heat-sensitive transfer papers, carbonless copy papers, corrugated fiberboards, white boards, and printed papers generated from photocopiers and office automation equipment. Waste magazine papers containing adhesive matters such as pressure sensitive adhesives, adhesives, adhesive tapes, bookbinding glue of magazines and the like can also be used as raw materials of recycled pulp of the present invention.

These waste papers used as raw materials of recycled pulp may contain inorganic particles called ash. The term "ash" refers to inorganic particles in general remaining after incineration of fillers, pigments and the like internally added or coated during the preparation of paper. For example, it means to include, but not limited to, calcium carbonate, talc, kaolin, titanium dioxide and the like.

Recycled pulp can contain sodium hydroxide, sodium silicate and other alkaline chemicals, deinking agents, oxidizing bleaches, and reducing bleaches, as appropriate. Further, dyes, fluorescent whitening agents, pH modifiers, defoamers, pitch control agents, slime control agents and the like can also be added as appropriate.

To deink the waste papers, deinking agents can be used, examples of which include, but not limited to, known or novel surfactants such as nonionic surfactants, anionic surfactants, cationic surfactants and amphoteric surfactants, e.g., fatty acid salts, higher alkyl sulfates, alkyl benzene sulfonates, higher alcohols, alkyl phenols, alkylene oxide adducts of fatty acids or the like, as well as organic solvents, proteins, enzymes, natural polymers, synthetic polymers and the like. These may be used alone or as a mixture of two or more of them.

(Fractionation)

In the present invention, a pulp slurry having a solids content of 1.5% by weight or more containing waste paper pulp is fractionated into a long fiber fraction and a short fiber fraction using an outward flow slit screen having openings with a width of 0.1 mm to 0.3 mm.

The pulp fractionating means that can be used in the present invention may be any outward flow type slit screen (outward flow slit screen), and preferably includes, for example, MaxFlow screens from Aikawa Iron Works Co., Ltd. and the like.

The term "outward flow screen" refers to a screen in which a raw material to be treated passes through openings of a screen basket in the direction from the interior to the exterior. Raw materials readily pass through this type of screen because its openings have a larger outside area than the inside area so that the external pressure tends to be lower than the internal pressure and a centrifugal force acts outward. On the other hand, the term "inward flow screen" refers to a screen in which a raw material passes through openings of a screen basket in the direction from the exterior to the interior, and which is unsuitable because it is harder to allow materials to pass through than the outward flow screen used in the present invention and it is liable to be clogged especially at such a high consistency as a solids content of 1.5% by weight or more. Conventionally, inward flow screens have been considered to allow more precise fiber fractionation than outward flow screens, but a pulp slurry having a high solids content is treated using an outward flow screen in the present invention.

A slit screen having slit-like openings is used for fractionation according to the present invention. Conventionally, hole screens having round openings have been typically used for fiber fractionation, but a slit screen is used in the present invention. If the hole size of round openings decreases, the open area of the basket decreases so that a large facility is required and such a screen is liable to be clogged with raw materials and contaminants, which makes it difficult to treat high-consistency slurries. If the hole size increases, adhesive contaminants or the like are not sufficiently separated so that the object of the present invention is not fulfilled.

In the present invention, the slit width is 0.1 to 0.3 mm, preferably 0.13 to 0.2 mm, more preferably 0.13 to 0.15 mm. Screens having a slit width smaller than 0.1 mm are liable to be clogged so that they are difficult to employ at a solids content of 1.5% by weight or more, and very difficult at 2.0% by weight or more as used in the present invention. If the slit width exceeds 0.3 mm, however, adhesive contaminants are not sufficiently separated so that much adhesive contaminants remain especially on the short fiber side and the quality of the finished pulp obtained from the short fiber fraction is degraded unless it undergoes fine screening.

The fractionation conditions in the present invention are not specifically limited so far as the pulp slurry to be treated has a solids content of 1.5% by weight or more. Preferably, the pulp slurry is screened at a consistency of 1.5% by weight or more and less than 4.0%, more preferably at a consistency of 1.8% by weight or more and less than 3.5%, even more preferably at a consistency of 2.2% by weight or more and less than 3.0%. In a preferred embodiment, a pulp slurry of defibered waste paper can be treated through the outward flow screen described above after it is passed through a coarse screen without being diluted to a solids content of approximately 1% by weight.

If the consistency is less than 1.5%, the fractionation efficiency improves but the advantages of energy saving and facility downsizing as achieved in the present invention cannot be achieved because a large fractionation facility is required and the consistency of the resulting short fiber fraction (accept side) decreases, which also requires a large post-treatment facility such as a large concentrator. On the other hand, slurries having a consistency of 4% or more are not suitable because they are difficult to fractionate by screening and tend to cause problems such as clogging.

When a pulp slurry is fractionated at high consistency as described above, a long fiber fraction having a consistency of 2.0% by weight or more can be obtained immediately after fractionation so that the long fiber fraction can be efficiently concentrated using a medium to high consistency concentrator without passing through a low-consistency concentrator, and the long fiber fraction can be stripped of inks very efficiently using an ink-detachment machine after it is concentrated to 25% by weight or more, for example.

Operating conditions of the screen in the present invention differ in optimal ranges from operating conditions of typical so-called fine screens. Thus, a preferred passing flow rate through the outward flow screen of the present invention is lower than those of typical fine screens, preferably in the range of 0.6 to 1.2 m/s, more preferably in the range of 0.7 to 1.0 m/s. Further, the circumferential speed of the agitator within the screen is higher than usual, preferably 14 to 20 m/s, more preferably 16 to 19 m/s.

(Long Fiber Fraction and Short Fiber Fraction)

As used herein, the term "long fiber fraction" refers to a fraction that is recovered as a reject side when a pulp slurry is treated through a screen and that is rich in relatively long fibers contained in the pulp slurry before treatment. The term "short fiber fraction" refers to a fraction that is recovered as an accept side of the screen and that is rich in relatively short fibers, fines and ash contained in the pulp slurry before treatment.

In the present invention, fractionation takes place at a fractionation ratio of solids of the resulting long fiber fraction/short fiber fraction of 10:90 to 60:40, and the benefits of the present invention are more remarkable at a fractionation ratio of 20:80 to 50:50, especially remarkable at 30:70 to 50:50. If the part of long fibers in the fractionation ratio of the long fiber fraction/short fiber fraction is smaller than 10:90, the benefits from separately subjecting the fractions to post-treatments decrease because the screening effect is merely on the same level as those obtained by so-called fine screens or the like used for contaminant-removal and the amount of fibers fractionated into the long fiber fraction is small. Ratios of long fibers higher than 60:40 are not suitable because the reject side of the screen must be in excess of the accept side, which causes problems such as tendency to clogging of slits and plugging of reject pipes.

In the present invention, fractionation also takes place to attain a difference in Canadian standard freeness of 100 to 300 ml between the resulting long fiber fraction and short fiber fraction, and the benefits of the present invention are especially remarkable when the difference in Canadian standard freeness is 150 to 200 ml. Differences in freeness of less than 100 ml are not suitable because fractionation between long fibers and short fibers does not work so well and accordingly, inks and adhesive contaminants are not separated well so that the finished pulp declines in quality. Especially when only long fibers are screened or only short fibers are flotated, the long fibers are not sufficiently deinked or the short fibers are not sufficiently cleared of adhesive contaminants. However, differences in freeness of 300 ml or more reduce the benefits from preliminarily fractionating a pulp slurry and separately treating the fractions because only long fibers must be removed so that the part of long fibers in the fractionation ratio is too small.

In the present invention, it is especially effective and convenient for preparing high-quality finished long fiber pulp to subject the long fiber fraction resulting from the fractionation as described above to pulverization of dirt using a high-consistency ink-detachment machine and to adhesive contaminant removal using a fine screen because the long fiber fraction contains much coarse dirt and adhesive contaminant particles in addition to relatively long fibers but less fine ink particles and ash.

On the other hand, it is especially effective and convenient for preparing high-quality finished short fiber pulp to subject the short fiber fraction after fractionation to ink-removal by washing or flotation, for example, because it contains much relatively short fibers, fines, inks, and ash but less coarse dirt and adhesive contaminant particles.

(Treatment of the Long Fiber Fraction)

In the present invention, recycled pulp may be obtained by subjecting the long fiber fraction to an ink detachment step and a contaminant removal step. In a preferred embodiment according to the present invention, a pulp slurry is fractionated at a solids content of 1.5% by weight or more using the screen described above to give a long fiber fraction having a consistency of 2.0% by weight or more immediately after fractionation so that the long fiber fraction can be efficiently concentrated by using a medium to high consistency concentrator without passing through a low-consistency concentrator, and after the long fiber fraction is dehydrated to, for example, a solids content of 25% or more, it can be stripped of inks very efficiently by pulverizing the inks and coarse dirt particles sticking to long fibers using a high consistency ink-detachment machine or the like, and finished long fiber pulp can be efficiently obtained by, for example, further diluting the long fiber fraction to a solids content of 0.5 to 1.2% and treating it through a fine screen to separate/remove contaminants.

As used herein, the term "low-consistency concentrator" refers to a predehydrator that dehydrates/concentrates a pulp having a consistency of approximately 1% to a consistency of approximately 3% by weight or more. Examples include a filtration/dehydration system using a pulp mat such as disk extractor or disk thickener, and a system based on spontaneous dehydration mechanism using a filter or dehydration element such as SP filter or trommel filter. All these systems have the disadvantages that they must have high capacity for treating low-consistency slurries and that they are costly to maintain due to clogging of disks or filters or the like.

In the present invention, fractionation takes place at a solids content of 1.5% by weight or more using the screen described above to concentrate the reject of the screen and therefore the long fiber fraction discharged as the reject has high consistency so that they can be post-treated without using a low-consistency concentrator, whereby facility downsizing and energy saving can be achieved.

As used herein, the term "medium to high consistency dehydrator" refers to an apparatus that dehydrates a pulp having a consistency of approximately 2 to 3% by weight to approximately 10% by weight or an apparatus that dehydrates a pulp having a consistency of approximately 10% by weight to approximately 25 to 30% by weight, such as screw thickener, inclined extractor, screw press or power press.

The high-consistency ink-detachment machine in the present invention may include a low-speed kneader, high-speed dispersers or the like. Kneaders that can be used include single shaft, twin-shaft and four-shaft kneaders, as well as those having two or more kneading elements. Dispersers that can be used include disk and conical dispersers.

In the present invention, contaminants can be separated/removed from the long fiber fraction after fractionation by using again a slit screen. The long fiber fraction is more likely to have been polluted with much adhesive contaminants during fractionation because this fraction corresponds to the reject of the screen. Thus, the contaminants should preferably be separated using a screen having a slit width of 0.1 to 0.2 mm, preferably 0.13 to 0.15 mm.

Preferably, the long fiber fraction is screened at a feed consistency of 0.5 to 1.2% by weight, more preferably 0.6 to 1.0% by weight, especially preferably 0.6 to 0.8% by weight because it contains high proportions of long fibers and coarse contaminants. If the feed consistency is less than 0.5% by weight, the production cost disadvantageously increases because a large treatment facility is needed. If it is higher than 1.2% by weight, the screen is liable to be clogged with raw materials containing high proportions of long fibers and large amounts of long fibers are discharged so that the retention decreases and the cost increases.

According to the present invention, the production efficiency can be improved by dispensing with the necessity of subjecting the whole pulp slurry to flotation most responsible for yield losses in the production process of recycled pulp and the necessity of ink-removal by flotation is eliminated by removing contaminant from the long fiber fraction through a screen having a slit width of 0.1 to 0.2 mm, whereby facility downsizing and energy saving can be achieved while maintaining the quality of the finished pulp.

(Treatment of the Short Fiber Fraction)

In the present invention, recycled pulp may be obtained by subjecting the short fiber fraction to an ink removal step. In a preferred embodiment according to the present invention, a finished short fiber pulp containing low levels of residual inks can be obtained by subjecting the short fiber fraction to ink detachment at a solids content of 5% by weight or less and then ink-removal by dehydration and washing and/or flotation.

The method of ink-detachment at a solids content of 5% or less is not specifically limited, and known ink-detachment methods can be applied, but a preferred embodiment can employ a method by which cavitation bubbles are aggressively introduced into a pulp slurry to strip fibers and ash of inks by using the energy released when the microbubbles collapse. The method for aggressively introducing cavitation bubbles is not specifically limited, and includes the method described in Japanese Patent No. 4291819, for example. Thus, pulp fibers can be stripped of inks by generating cavitation bubbles using liquid jets and bringing them into contact with a pulp suspension.

According to the present invention, only the short fiber fraction rather than the whole pulp slurry can be subjected to flotation most responsible for yield losses in the production process of recycled pulp, whereby facility downsizing and energy saving can be achieved while maintaining the quality of the finished pulp.

(Preparation of Paper)

The finished long fiber pulp and finished short fiber pulp obtained by the present invention can be separately incorporated as raw materials to prepare paper. Further, they can be mixed in a given ratio to provide characteristic papers as compared with conventional papers obtained from unfractionated whole pulp. For example, papers containing higher proportions of the finished long fiber pulp have higher bulkiness and higher tear strength. On the other hand, papers containing higher proportions of the finished short fiber pulp have higher density, higher tensile strength (breaking length) and higher smoothness and air resistance.

Moreover, a stock containing these finished long fiber pulp and/or finished short fiber pulp mixed with other raw materials may be used to prepare paper. The other raw materials include, but not limited to, softwood or hardwood kraft pulp (NKP or LKP); mechanical pulps using softwood or hardwood such as e.g., groundwood pulp (GP), refiner groundwood pulp (RGP), thermomechanical pulp (TMP), chemithermomechanical pulp (CTMP), chemigroundwood pulp (CGP), semichemical pulp (SCP) and the like; waste paper pulp obtained by defibering corrugated fiberboard; coated broke obtained by defibering broke including coated paper, coating base paper and other paper; and mixtures of two or more of these pulps.

Further, multilayer paper can also be prepared in a multilayer paper machine by incorporating the finished long fiber pulp or finished short fiber pulp obtained by the present invention or both in any ratio into the stock of each layer.

The finished long fiber pulp or finished short fiber pulp obtained by the present invention can be separately combined with chemicals and/or fillers to make paper. Especially, characteristic papers such as high-ash but high-strength paper can be prepared by adding starches or paper strength additives to the finished long fiber pulp while adding fillers and then retention aids, coagulants, paper strength additives and starches to the short fiber pulp and incorporating both to prepare paper.

Chemicals to be added include sizing agents such as rosin emulsion, neutral rosin, alkyl ketene dimer, alkenyl succinic anhydride, and styrene-acrylic copolymers; dry-strength enhancers such as resins containing a cationic, zwitterionic or anionic polyacrylamide, polyvinylamine or polyacrylic acid, and guar gum; wet-strength enhancers such as cationic, zwitterionic or anionic modified starches, polyamidoamine-epichlorohydrin and carboxymethyl cellulose; conventionally used internal additives such as drainage aids, colorants, dyes and fluorescent dyes; as well as bulking agents for increasing the bulk (i.e., decreasing the density) of paper.

Examples of coagulants include cationic polymers such as polyethyleneimines and modified polyethyleneimines containing a tertiary and/or quaternary ammonium group, polyalkyleneimines, dicyandiamide polymers, polyamines, polyamine/epichlorohydrin polymers, and dialkyldiallyl quaternary ammonium monomers, dialkylaminoalkyl acrylates, dialkylaminoalkyl methacrylates, dialkylaminoalkyl acrylamide/acrylamide polymers, dialkylaminoalkyl methacrylamide/acrylamide polymers, monoamine/epihalohydrin polymers, polyvinylamines and vinylamine-containing polymers as well as mixtures thereof; cation-rich zwitterionic polymers having an anionic group such as carboxyl or sulfone copolymerized in the molecules of the polymers mentioned above; and mixtures of a cationic polymer with an anionic or zwitterionic polymer.

Further, retention aids may include retention aid systems called dual polymers or micropolymers combining at least one or more cationic or anionic chemicals with a cationic, zwitterionic or anionic high-molecular weight polymer, especially a polyacrylamide-based material or a copolymer containing such a material; as well as retention aid systems combining at least one or more anionic inorganic microparticles such as bentonite, colloidal silica, polysilicic acid, microgels of polysilicic acid or polysilicic acid salts and aluminum-modified products thereof, and organic microparticles of crosslinked/polymerized acrylamide having a particle size of 100 μm or less called micropolymers. Further, multi-component retention aid systems combining these systems may also be used.

Further, fillers may include any particles commonly known as inorganic fillers and organic fillers and are not specifically limited. Specifically, inorganic fillers include calcium carbonate (precipitated calcium carbonate, ground calcium carbonate, synthetic calcium carbonate), magnesium carbonate, barium carbonate, aluminum hydroxide, calcium hydroxide, magnesium hydroxide, zinc hydroxide, clay (kaolin, calcined kaolin, delaminated kaolin), talc, zinc oxide, zinc stearate, titanium dioxide, silica prepared from sodium silicate and mineral acids (white carbon, silica/calcium carbonate complexes, silica/titanium dioxide complexes), terra alba, bentonite, kieselguhr, calcium sulfate, inorganic fillers using ash recycled from deinking processes, and inorganic fillers using a complex of the ash with silica or calcium carbonate formed during the recycling process, and the like. Calcium carbonate-silica complexes include calcium carbonate and/or precipitated calcium carbonate-silica complexes, which may be used in combination with amorphous silica such as white carbon. Among them, typical fillers in neutral and alkaline papermaking such as calcium carbonate and precipitated calcium carbonate-silica complexes are preferably used. Organic fillers include urea-formalin resins, polystyrene resins, phenol resins, hollow microparticles, acrylamide complexes, wood-derived materials (fines, microfibrils, kenaf powder), modified/insolubilized starches, ungelatinized starches, etc. They may be used alone or as a combination of two or more of them.

Additionally, cellulose nanofibers or finely divided cellulose or modified products thereof may also be added.

EXAMPLES

The following examples further illustrate the present invention without, however, limiting the invention thereto. As used herein, parts and % are on a weight basis respectively, and numerical ranges are indicated to include their endpoints, unless otherwise specified.

Evaluation Methods

The long fiber and short fiber fractions obtained were evaluated for consistency and freeness, the electric power required for fractionation (power consumption rate), as well as water consumption as described below. Further, the fibers before fractionation and the long fiber and short fiber fractions were analyzed for ash content, average fiber length, fiber size composition and the number of adhesive contaminant particles. Further, handsheets having a basis weight of 60 g/m$^2$ were prepared according to JIS P 8209 using a cylinder handsheet machine, and determined for the number of dirt particles, brightness, and ink levels.

(Freeness CSF)

Determined according to the Canadian standard freeness method defined in JIS P 8121:1995.

(Power Consumption Rate)

The electric power required for fractionation was calculated from the motor load and the throughput per hour during operation of the screen and reported as power consumption rate. As this value increase, the production cost increases.

(Water Consumption)

Calculated as the amount of water per ton of pulp by dividing the treated flow rate per unit time during operation of the screen by the treated solids. As this value increases, the amount of water required to treat pulp containing 1 ton of solids increases, which requires a facility with higher capacity (volume).

(Ash Content)

Determined according to JIS P 8251:2003.

(Average Fiber Length)

The length weighted average fiber length was determined using a fiber tester (from Lorentzen & Wettre).

(Fiber Size Composition)

The fiber composition was determined according to JIS P 8207:1976 using 24-mesh, 42-mesh, 80-mesh and 150-mesh screens. In Table 2 and Table 3 below, 24 mesh on indicates the proportion of fibers retained on the 24-mesh screen. Further, 42 mesh on indicates the proportion of fibers passing through the 24-mesh screen but retained on the 42-mesh screen (and so on for 80 mesh on and 150 mesh on). Further, 150 mesh pass indicates the proportion of fibers passing through the 150-mesh screen.

(Number of Dirt Particles)

Dirt particles of 0.05 mm$^2$ or more on five different handsheets were counted by image processing using a contaminant analyzer (Spec*Scan 2000 from Apogee Technologies Inc.) and the number of dirt particles per m$^2$ was calculated.

(Brightness)

Determined according to JIS P8148 using a colorimeter (from Murakami Color Research Laboratory Co., Ltd.).

(Residual Ink Levels)

To determine the residual ink levels, fine ink particles were analyzed for ERIC (effective residual ink concentration) values using a residual ink level measuring system (Color Touch from Technidyne Corporation).

(Adhesive Contaminants)

About 1 kg of a pulp slurry on a bone dry basis was precisely metered and treated using a 6-cut flat screen, and the residue retained on the screen was recovered and hot-pressed between filter sheets, and then stained with a hydrophobic dye. The number of contaminant particles stained with the dye was counted.

Experiment 1

Example 1

In a pilot test plant of Aikawa Iron Works Co., Ltd., waste newspaper and waste magazine paper were introduced into a high-consistency pulper at a weight ratio of 7:3 and defibered at a temperature of 40° C. for 15 minutes in the presence of 1% by weight (net) of caustic soda, 1% by weight (gross) of sodium silicate, 0.5% (net) of hydrogen peroxide and 0.2% (gross) of a higher alcohol deinking agent based on the input solids content. The pulp obtained after defibration was treated at a solids content of 2.5% by weight using a coarse screen having a slit width of 0.2 mm to remove contaminants such as coarse adhesive contaminants, thereby giving a pulp slurry containing waste paper pulp (waste paper pulp slurry A).

Then, waste paper pulp slurry A adjusted to a solids content of 1.9% by weight was fractionated into a long fiber fraction and a short fiber fraction using an outward flow slit screen. Specifically, it was treated using an outward flow slit screen (MaxFlow:MAX1-400 screen) from Aikawa Iron Works Co., Ltd. under conditions of a slit width of 0.15 mm, a passing flow rate of 1.0 m/s, and a circumferential speed of the agitator of 16 m/s to give a long fiber fraction and a short fiber fraction. The long fiber fraction here corresponds to the reject side of the screen while the short fiber fraction corresponds to the accept side, and the solids content ratio (fractionation ratio) between the long fiber fraction and the short fiber fraction was 21:79.

Example 2

The same procedure as described in Example 1 was followed except that the fractionation ratio between the long fiber fraction and the short fiber fraction was adjusted to 47:53 by controlling the feed flow rate and the reject flow rate of the fractionating screen.

Example 3

The same procedure as described in Example 1 was followed except that waste paper pulp slurry A was adjusted to a solids content of 1.6% by weight and treated under conditions of a slit width of 0.13 mm, a passing flow rate of 0.9 m/s, and a circumferential speed of the agitator of 14 m/s, and the fractionation ratio between the long fiber fraction and the short fiber fraction was adjusted to 22:78 by controlling the feed flow rate and the reject flow rate of the fractionating screen.

Example 4

The same procedure as described in Example 3 was followed except that the slurry was treated under conditions of a passing flow rate of 0.7 m/s, and a circumferential speed of the agitator of 13 m/s, and the fractionation ratio between the long fiber fraction and the short fiber fraction was adjusted to 26:74 by controlling the feed flow rate and the reject flow rate of the fractionating screen.

Example 5

In a pilot test plant of Aikawa Iron Works Co., Ltd., waste newspaper and waste magazine paper were introduced into a high-consistency pulper at a weight ratio of 8:2 and defibered at a temperature of 40° C. for 15 minutes in the presence of 1% by weight (net) of caustic soda, 1% by weight (gross) of sodium silicate, 0.17% (net) of hydrogen peroxide and 0.18% (gross) of a higher alcohol deinking agent based on the input solids content. The pulp obtained after defibration was treated at a solids content of 3.3% by weight using a coarse screen having a slit width of 0.2 mm to remove contaminants such as coarse adhesive contaminants, thereby giving a pulp slurry containing waste paper pulp (waste paper pulp slurry B).

Waste paper pulp slurry B adjusted to a solids content of 2.4% by weight was fractionated using the same outward flow slit screen as used in Example 1 under conditions of a slit width of 0.13 mm, a passing flow rate of 0.8 m/s, and a circumferential speed of the agitator of 18 m/s (the fractionation ratio between the long fiber fraction and the short fiber fraction was 24:76).

Example 6

The same procedure as described in Example 5 was followed except that the fractionation ratio between the long fiber fraction and the short fiber fraction was adjusted to 30:70 by controlling the feed flow rate and the reject flow rate of the fractionating screen.

Example 7

The same procedure as described in Example 5 was followed except that the fractionation ratio between the long fiber fraction and the short fiber fraction was adjusted to 44:56 by controlling the feed flow rate and the reject flow rate of the fractionating screen.

Example 8

The same procedure as described in Example 5 was followed except that the fractionation ratio between the long fiber fraction and the short fiber fraction was adjusted to 40:60 by controlling the feed flow rate and the reject flow rate of the fractionating screen.

Comparative Example 1

The same procedure as described in Example 1 was followed except that the fractionation ratio between the long fiber fraction and the short fiber fraction was adjusted to 65:35 by controlling the feed flow rate and the reject flow rate of the fractionating screen.

Comparative Example 2

The same procedure as described in Example 1 was followed except that the solids content of waste paper pulp slurry A was adjusted to 1.3% by weight and that the fractionation ratio between the long fiber fraction and the short fiber fraction was adjusted to 22:78 by controlling the feed flow rate and the reject flow rate of the fractionating screen.

Comparative Example 3

The same procedure as described in Comparative example 2 was followed except that the fractionation ratio between the long fiber fraction and the short fiber fraction was adjusted to 48:52 by controlling the feed flow rate and the reject flow rate of the fractionating screen.

Comparative Example 4

The same procedure as described in Comparative example 2 was followed except that the fractionation ratio between the long fiber fraction and the short fiber fraction was adjusted to 60:40 by controlling the feed flow rate and the reject flow rate of the fractionating screen.

Comparative Example 5

Fractionation was preceded by ink-removal using flotation. Specifically, waste paper pulp B of Example 5 was treated by flotation at a solids content of 1%, 40° C. using MAC Cell flotator from Aikawa Iron Works Co., Ltd. to give a flotation accept material. Then, the accept having a solids content of 0.8% by weight was fractionated into a long fiber fraction and a short fiber fraction at a fractionation ratio of 39:61 using the same outward flow slit screen as used in Example 1 under conditions of a slit width of 0.13 mm, a passing flow rate of 0.8 m/s, and a circumferential speed of the agitator of 16.5 m/s.

Comparative Example 6

In a pilot test plant of Aikawa Iron Works Co., Ltd., waste newspaper and waste magazine paper were introduced into a high-consistency pulper at a weight ratio of 8:2 and defibered at a temperature of 40° C. for 15 minutes in the presence of 1% by weight (net) of caustic soda, 1% by weight (gross) of sodium silicate, 0.5% (net) of hydrogen peroxide and 0.2% (gross) of a higher alcohol deinking agent based on the input solids content. The pulp obtained after defibration was treated at a solids content of 2.3% by weight using a coarse screen having a slit width of 0.2 mm to remove contaminants such as coarse adhesive contaminants, and further notated at a solids content of 1.2%, 40° C. to remove inks, thereby giving a pulp slurry containing waste paper pulp (waste paper pulp slurry C).

Waste paper pulp slurry C adjusted to a solids content of 0.9% by weight was fractionated into a long fiber fraction and a short fiber fraction using an inward flow slit screen. Specifically, it was fractionated into a long fiber fraction and a short fiber fraction at a fractionation ratio of 64:36 using an inward flow slit screen (FH-400) from Aikawa Iron Works Co., Ltd. under conditions of a slit width of 0.10 mm, a passing flow rate of 1.0 m/s, and a circumferential speed of the agitator of 16.5 m/s.

Comparative Example 7

The same procedure as described in Comparative example 6 was followed except that the fractionation ratio between the long fiber fraction and the short fiber fraction was 39:61.

<Evaluation Results>

Evaluation results are shown in Table 1 and Table 2.

A comparison of Examples 1 and 2 vs. Comparative examples 2-5 shows that when the feed consistency in the fractionating screen is lower than 1.5% by weight, the consistency of the long fiber fraction decreases, which requires larger post-treatment facilities so that the production cost increases. Further, water consumption increases so that the production cost disadvantageously increases.

A comparison of Examples 1-8 vs. Comparative examples 1 and 4 shows that when the fractionation ratio of the long fiber fraction is higher than 60%, the difference in freeness between the long fiber fraction and the short fiber fraction becomes less than 100 ml so that the difference in fiber size composition decreases and the distribution of dirt and inks also decreases, which requires a dirt pulverization step for removing ink from both fractions, whereby the production cost increases.

A comparison of Example 8 vs. Comparative example 5 shows that when fractionation is preceded by flotation, the feed consistency for the subsequent fractionation decreases, the electric power required for the treatment increases, and water consumption increases. Further, the consistency of the long fiber fraction decreases, which requires larger post-treatment facilities so that the production cost increases.

A comparison of Examples 1-8 vs. Comparative examples 6 and 7 shows that when an inward flow screen is used, the feed consistency cannot be raised and the consistency of the long fiber fraction decreases because the screen is more liable to be clogged. Further, the electric power required for the treatment increases and water consumption increases so that the production cost disadvantageously increases.

TABLE 1

| | Screen type | Inlet consistency % | Slit width mm | Passing flow rate m/s | Circumferential speed of the agitator m/s | Fractionation ratio (%) | |
|---|---|---|---|---|---|---|---|
| | | | | | | Long fiber | Short fiber |
| Example 1 | Outward | 1.9 | 0.15 | 1.0 | 16.0 | 21 | 79 |
| Example 2 | Outward | 1.9 | 0.15 | 1.0 | 16.0 | 47 | 53 |
| Example 3 | Outward | 1.6 | 0.13 | 0.9 | 14.0 | 22 | 78 |
| Example 4 | Outward | 1.6 | 0.13 | 0.7 | 13.0 | 26 | 74 |
| Example 5 | Outward | 2.4 | 0.13 | 0.8 | 18.0 | 24 | 76 |
| Example 6 | Outward | 2.4 | 0.13 | 0.8 | 18.0 | 30 | 70 |
| Example 7 | Outward | 2.4 | 0.13 | 0.8 | 18.0 | 44 | 56 |
| Example 8 | Outward | 2.4 | 0.13 | 0.8 | 18.0 | 40 | 60 |
| Comparative example 1 | Outward | 1.9 | 0.15 | 1.0 | 16.0 | 65 | 35 |
| Comparative example 2 | Outward | 1.3 | 0.15 | 1.0 | 16.0 | 22 | 78 |
| Comparative example 3 | Outward | 1.3 | 0.15 | 1.0 | 16.0 | 48 | 52 |
| Comparative example 4 | Outward | 1.3 | 0.15 | 1.0 | 16.0 | 60 | 40 |

TABLE 1-continued

|  |  |  |  |  |  |  |  |
|---|---|---|---|---|---|---|---|
| Comparative example 5 | Outward | 0.8 | 0.13 | 0.8 | 16.5 | 39 | 61 |
| Comparative example 6 | Inward | 0.9 | 0.10 | 1.0 | 16.5 | 64 | 36 |
| Comparative example 7 | Inward | 0.9 | 0.10 | 1.0 | 16.5 | 39 | 61 |

|  | Outlet consistency (%) | | Freeness CSF (ml) | | | Power consumption rate kWh/t | Water consumption (m³/t) |
|---|---|---|---|---|---|---|---|
|  | Long fiber | Short fiber | Long fiber | Short fiber | ΔCSF | | |
| Example 1 | 2.7 | 1.7 | 366 | 203 | 163 | 6.8 | 53 |
| Example 2 | 2.1 | 1.6 | 282 | 182 | 100 | 4.2 | 53 |
| Example 3 | 2.4 | 1.4 | 377 | 187 | 190 | 6.6 | 63 |
| Example 4 | 2.6 | 1.3 | 406 | 172 | 234 | 6.1 | 63 |
| Example 5 | 3.9 | 2.2 | 395 | 222 | 173 | 9.0 | 41 |
| Example 6 | 3.6 | 2.1 | 385 | 210 | 175 | 8.0 | 41 |
| Example 7 | 3.1 | 2.1 | 361 | 198 | 163 | 7.0 | 41 |
| Example 8 | 3.1 | 2.1 | 371 | 191 | 180 | 7.1 | 42 |
| Comparative example 1 | 1.9 | 1.7 | 246 | 194 | 52 | 2.8 | 53 |
| Comparative example 2 | 1.8 | 1.2 | 360 | 210 | 150 | 9.2 | 77 |
| Comparative example 3 | 1.5 | 1.0 | 298 | 185 | 113 | 6.8 | 77 |
| Comparative example 4 | 1.3 | 1.1 | 259 | 170 | 89 | 4.4 | 77 |
| Comparative example 5 | 1.1 | 0.7 | 344 | 184 | 160 | 8.9 | 119 |
| Comparative example 6 | 1.3 | 0.6 | 343 | 103 | 240 | 15.1 | 109 |
| Comparative example 7 | 1.7 | 0.7 | 403 | 148 | 255 | 21.3 | 109 |

TABLE 2

| # |  | Ash content % | Number of dirt particles #/m² | Brightness % | Ink levels ppm | Adhesive contaminants #/m² |
|---|---|---|---|---|---|---|
| Example 1 | Before fractionation | 11.0 | 2,100 | 46.5 | 1,517 |  |
|  | Long fiber | 6.5 | 3,700 | 48.3 | 1,178 |  |
|  | Short fiber | 9.3 | 1,500 | 45.4 | 1,607 |  |
| Example 2 | Before fractionation | 11.0 | 2,100 | 46.5 | 1,517 |  |
|  | Long fiber | 9.3 | 2,400 | 47.9 | 1,333 |  |
|  | Short fiber | 10.8 | 940 | 45.7 | 1,614 |  |
| Example 3 | Before fractionation | 12.0 | 1,700 | 47.5 | 1,444 |  |
|  | Long fiber | 6.7 | 3,400 | 48.7 | 1,130 |  |
|  | Short fiber | 10.1 | 1,100 | 46.6 | 1,550 |  |
| Example 4 | Before fractionation | 12.0 | 1,700 | 47.5 | 1,444 |  |
|  | Long fiber | 4.9 | 4,200 | 50.1 | 932 |  |
|  | Short fiber | 9.6 | 1,100 | 45.6 | 1,665 |  |
| Example 5 | Before fractionation | 11.4 | 3,400 | 39.7 | 2,087 |  |
|  | Long fiber | 6.8 | 6,700 | 40.5 | 1,704 |  |
|  | Short fiber | 13.4 | 3,200 | 38.5 | 2,228 |  |
| Example 6 | Before fractionation | 11.4 | 3,400 | 39.7 | 2,087 |  |
|  | Long fiber | 9.0 | 4,200 | 41.4 | 1,743 |  |
|  | Short fiber | 13.2 | 2,600 | 38.4 | 2,327 |  |
| Example 7 | Before fractionation | 11.4 | 3,400 | 39.7 | 2,087 |  |
|  | Long fiber | 9.2 | 3,300 | 40.0 | 1,938 |  |
|  | Short fiber | 14.1 | 2,500 | 41.8 | 2,185 |  |
| Example 8 | Before fractionation | 11.5 | 3,400 | 43.3 | 2,087 | 665 |
|  | Long fiber | 8.8 | 5,500 | 43.6 | 1,601 | 1,374 |
|  | Short fiber | 13.4 | 1,800 | 42.9 | 2,133 | 50 |
| Comparative example 1 | Before fractionation | 11.0 | 2,100 | 46.5 | 1,517 |  |
|  | Long fiber | 8.2 | 2,100 | 47.9 | 1,321 |  |
|  | Short fiber | 9.7 | 1,400 | 46.8 | 1,515 |  |
| Comparative example 2 | Before fractionation | 10.9 | 1,700 | 48.7 | 1,296 |  |
|  | Long fiber | 7.6 | 4,000 | 48.8 | 1,114 |  |
|  | Short fiber | 12.2 | 1,300 | 45.7 | 1,621 |  |
| Comparative example 3 | Before fractionation | 10.9 | 1,700 | 48.7 | 1,296 |  |
|  | Long fiber | 9.0 | 2,800 | 48.8 | 1,216 |  |
|  | Short fiber | 10.6 | 880 | 47.0 | 1,552 |  |

TABLE 2-continued

| # | | | | | | |
|---|---|---|---|---|---|---|
| Comparative example 4 | Before fractionation | 10.9 | 1,700 | 48.7 | 1,296 | |
| | Long fiber | 7.0 | 2,000 | 47.1 | 1,429 | |
| | Short fiber | 12.9 | 1,500 | 47.2 | 1,492 | |
| Comparative example 5 | Before fractionation | 11.0 | 3,400 | 42.7 | 2,087 | 665 |
| | Long fiber | 8.0 | 4,900 | 44.9 | 1,328 | 1,816 |
| | Short fiber | 13.1 | 2,100 | 36.3 | 2,197 | 98 |
| Comparative example 6 | Before fractionation | 10.3 | 1,600 | 55.1 | 702 | 1,731 |
| | Long fiber | 7.5 | 3,000 | 55.8 | 777 | 4,295 |
| | Short fiber | 15.9 | 640 | 53.3 | 581 | 464 |
| Comparative example 7 | Before fractionation | 10.3 | 1,600 | 55.1 | 702 | |
| | Long fiber | 6.1 | 3,500 | 56.0 | 703 | |
| | Short fiber | 13.6 | 1,100 | 54.4 | 523 | |

| # | | Average fiber length mm | Fiber size composition (%) | | | | |
|---|---|---|---|---|---|---|---|
| | | | 24 mesh on | 42 mesh on | 50 mesh on | 150 mesh on | 150 mesh pass |
| Example 1 | Before fractionation | 0.96 | 14.9 | 28.2 | 23.4 | 8.4 | 25.0 |
| | Long fiber | 1.06 | 27.6 | 26.0 | 22.2 | 7.3 | 16.9 |
| | Short fiber | 0.95 | 14.0 | 26.1 | 23.5 | 8.1 | 28.3 |
| Example 2 | Before fractionation | 0.96 | 14.9 | 28.2 | 23.4 | 8.4 | 25.0 |
| | Long fiber | 1.02 | 21.7 | 27.0 | 21.8 | 8.6 | 20.9 |
| | Short fiber | 0.97 | 14.1 | 27.7 | 23.9 | 8.4 | 25.8 |
| Example 3 | Before fractionation | 0.96 | 14.9 | 28.2 | 23.4 | 8.4 | 25.0 |
| | Long fiber | 1.06 | 28.5 | 27.0 | 22.4 | 6.8 | 15.3 |
| | Short fiber | 0.95 | 13.1 | 25.7 | 22.9 | 9.3 | 29.0 |
| Example 4 | Before fractionation | 0.96 | 14.9 | 28.2 | 23.4 | 8.4 | 25.0 |
| | Long fiber | 1.07 | 29.1 | 27.6 | 22.1 | 6.5 | 14.7 |
| | Short fiber | 0.94 | 12.5 | 25.2 | 23.0 | 9.8 | 29.5 |
| Example 5 | Before fractionation | 1.01 | 19.6 | 32.9 | 23.4 | 7.7 | 16.4 |
| | Long fiber | 1.05 | 27.3 | 25.4 | 20.6 | 6.2 | 20.5 |
| | Short fiber | 0.96 | 13.9 | 31.1 | 24.1 | 7.9 | 23.1 |
| Example 6 | Before fractionation | 1.01 | 19.6 | 32.9 | 23.4 | 7.7 | 16.4 |
| | Long fiber | 1.07 | 27.8 | 27.9 | 21.7 | 6.6 | 16.1 |
| | Short fiber | 0.96 | 13.6 | 31.9 | 24.4 | 8.1 | 21.9 |
| Example 7 | Before fractionation | 1.01 | 19.6 | 32.9 | 23.4 | 7.7 | 16.4 |
| | Long fiber | 1.03 | 21.9 | 26.2 | 20.4 | 7.0 | 24.4 |
| | Short fiber | 0.96 | 12.8 | 31.7 | 24.1 | 8.2 | 23.1 |
| Example 8 | Before fractionation | 0.99 | 17.2 | 29.1 | 22.4 | 7.2 | 24.0 |
| | Long fiber | 1.04 | 23.4 | 27.4 | 14.9 | 6.7 | 27.6 |
| | Short fiber | 0.93 | 12.4 | 30.7 | 23.8 | 7.9 | 25.1 |
| Comparative example 1 | Before fractionation | 0.96 | 14.9 | 28.2 | 23.4 | 8.4 | 25.0 |
| | Long fiber | 0.97 | 19.4 | 26.7 | 22.5 | 7.6 | 23.8 |
| | Short fiber | 0.93 | 19.1 | 29.1 | 19.5 | 6.1 | 26.3 |
| Comparative example 2 | Before fractionation | 0.98 | 17.5 | 26.3 | 23.4 | 7.8 | 25.0 |
| | Long fiber | 1.05 | 27.2 | 25.2 | 21.8 | 7.1 | 18.6 |
| | Short fiber | 0.89 | 14.7 | 26.4 | 23.8 | 8.1 | 27.0 |
| Comparative example 3 | Before fractionation | 0.98 | 17.5 | 26.3 | 23.4 | 7.8 | 25.0 |
| | Long fiber | 1.03 | 21.1 | 25.6 | 22.3 | 7.4 | 23.6 |
| | Short fiber | 0.91 | 12.6 | 26.0 | 23.1 | 8.0 | 30.2 |
| Comparative example 4 | Before fractionation | 0.98 | 17.5 | 26.3 | 23.4 | 7.8 | 25.0 |
| | Long fiber | 0.96 | 19.4 | 25.7 | 22.6 | 7.6 | 24.6 |
| | Short fiber | 0.88 | 12.1 | 23.9 | 22.9 | 8.2 | 32.8 |
| Comparative example 5 | Before fractionation | 0.96 | 14.9 | 28.2 | 23.4 | 8.4 | 25.0 |
| | Long fiber | 1.02 | 24.6 | 26.5 | 21.1 | 8.0 | 19.8 |
| | Short fiber | 0.96 | 13.9 | 27.8 | 23.7 | 8.1 | 26.5 |
| Comparative example 6 | Before fractionation | 0.97 | 16.7 | 27.9 | 20.9 | 7.0 | 27.5 |
| | Long fiber | 1.06 | 25.6 | 28.2 | 19.6 | 7.3 | 19.3 |
| | Short fiber | 0.79 | 3.5 | 28.6 | 23.6 | 8.4 | 35.9 |
| Comparative example 7 | Before fractionation | 0.97 | 16.7 | 27.9 | 20.9 | 7.0 | 27.5 |
| | Long fiber | 1.16 | 36.2 | 27.6 | 20.5 | 6.5 | 9.2 |
| | Short fiber | 0.82 | 6.3 | 29.5 | 22.9 | 8.8 | 32.4 |

Experiment 2

Example 9

In the same manner as in Example 1, waste paper pulp slurry A was fractionated into a long fiber fraction and a short fiber fraction (fractionation ratio 21:79).

The long fiber and short fiber fractions were each treated according to Flow I in FIG. 1. The long fiber fraction was dehydrated to a solids content of about 30% by weight by medium to high consistency dehydration using an inclined extractor and a screw press, and then contaminants were dispersed at a solids content of 26%, 57° C. under a load of 50 kwh/t using a conical disperser (ConiDisc disperser from Aikawa Iron Works Co., Ltd.). The treated pulp was diluted to a consistency of 0.7% by weight and removed from contaminant using a fine screen (GFFH screen having a slit width of 0.15 mm from Aikawa Iron Works Co., Ltd.), and further treated in a low-consistency concentrator and a washer/dehydrator to give a finished long fiber pulp (finished long fiber pulp A).

On the other hand, the short fiber fraction was concentrated to a solids content of 2.6% by weight using a low-consistency concentrator, and then subjected to ink-detachment with cavitation bubbles using a cavitator (from Nippon Paper Industries Co., Ltd.). The cavitation treatment involved one pass jet cavitation treatment by injecting liquid jets at a pressure (upstream pressure) of 8 MPa through a nozzle having a nozzle diameter of 0.2 mm into the pulp slurry in a target container (at a pressure (downstream pressure) of 0.34 MPa in the target container) to generate cavitation bubbles and bringing the cavitation bubbles into contact with the pulp. The treated pulp was diluted to a consistency of 1.2% by weight, and flotated using a pressure flotator to give a finished short fiber pulp (finished short fiber pulp A).

The resulting finished long fiber pulp A and finished short fiber pulp A were analyzed for freeness, ash content, average fiber length, fiber size composition, the number of dirt particles, brightness, ink levels, and the number of adhesive contaminant particles in the same manner as in Experiment 1. Further, the integral electric power required for obtaining each finished pulp from the waste paper defibration step shown in Flow I was calculated from the electric power consumed for various post-fractionation treatments in proportion to the fractionation ratio, and reported as integral power consumption rate. Further, the amount of water required for the most water-consuming treatment in the steps shown in Flow I was reported as maximum water consumption.

Example 10

A short fiber pulp was obtained in the same manner as in Example 9 except that the short fiber fraction was not subjected to cavitation (finished short fiber pulp B).

Example 11

A handsheet was prepared by blending finished long fiber pulp A and finished short fiber pulp A in a ratio of 20/80 and evaluated in the same manner as in Examples 9 and 10. The blending ratio of the pulps was selected to correspond to the fractionation ratio of Example 9 (21:79).

Example 12

The same procedure as described in Example 11 was followed except that the blending ratio between finished long fiber pulp A and finished short fiber pulp A was long fiber/short fiber=50/50.

Example 13

The same procedure as described in Example 11 was followed except that the blending ratio between finished long fiber pulp A and finished short fiber pulp A was long fiber/short fiber=70/30.

Example 14

The same procedure as described in Example 11 was followed except that finished short fiber pulp B was used as short fiber pulp.

Example 15

The same procedure as described in Example 14 was followed except that the blending ratio between finished long fiber pulp A and finished short fiber pulp B was long fiber/short fiber=50/50.

Example 16

The same procedure as described in Example 14 was followed except that the blending ratio between finished long fiber pulp A and finished short fiber pulp B was long fiber/short fiber=70/30.

Example 17

A finished long fiber pulp was obtained in the same manner as in Example 9 except that the long fiber fraction obtained in Example 8 was subjected to ink-detachment at a solids content of 30%, 86° C. under a load of 60 kwh/t using a four-shaft kneader (UV—Breaker from Aikawa Iron Works Co., Ltd.) in place of the conical disperser in the treatments of the long fiber fraction shown in Flow I in FIG. 1 (finished long fiber pulp B).

Example 18

A finished short fiber pulp C was obtained in the same manner as in Example 9 except that the short fiber fraction obtained in Example 8 was subjected to one pass jet cavitation at a solids content of 2.1% by weight using a cavitator with a nozzle diameter of 0.2 mm at a liquid jet pressure (upstream pressure) of 6 MPa and a pressure in the target container (downstream pressure) of 0.2 MPa in place of the low-consistency concentrator in the treatments of the short fiber fraction shown in Flow I in FIG. 1 (finished short fiber pulp C).

Example 19

A finished short fiber pulp was obtained in the same manner as in Example 9 except that the short fiber fraction obtained in Example 8 was concentrated to a solids content of 3.3% by weight using a low-consistency concentrator, followed by cavitation and then ink-removal using a washer/dehydrator in place of the flotator in the treatments of the short fiber fraction shown in Flow I in FIG. 1 (finished short fiber pulp D).

Comparative Example 8

As in typical conventional deinking methods, waste paper pulp slurry A obtained in Example 1 was treated according to a standard process for preparing deinked pulp shown in Flow II in FIG. 1 without undergoing fractionation to give a finished pulp (finished conventional pulp). Specifically, waste paper pulp slurry A was flotated at a solids content of 1% using an open flotator (Hyper-Cell from Aikawa Iron Works Co., Ltd.) and removed from contaminant at a consistency of 0.8% using a fine screen (GFFH screen having a slit width of 0.15 mm from Aikawa Iron Works Co., Ltd.). The treated pulp was dehydrated to a solids content of about 30% by weight using a low-consistency concentrator followed by an inclined extractor and a screw press, and then contaminants were dispersed at a solids content of 29%, 57° C. under a load of 50 kwh/t using a conical disperser (ConiDisc disperser from Aikawa Iron Works Co., Ltd.). The treated pulp was diluted to a consistency of 3.4% by weight, and then treated in a washer/dehydrator to give a finished conventional pulp.

The resulting finished conventional pulp was analyzed for freeness, ash content, average fiber length, fiber size composition, the number of dirt particles, brightness, ink levels, and the number of adhesive contaminant particles in the same manner as in Experiment 1. Further, the integral electric power required for obtaining the finished pulp from the waste paper defibration process shown in Flow II was calculated from the electric power consumed for various treatments and reported as integral power consumption rate. Further, the amount of water required for the most water-consuming treatment in the steps shown in Flow II was reported as maximum water consumption.

Comparative Example 9

A finished long fiber pulp was obtained in the same manner as in Example 9 except that the long fiber fraction obtained in Comparative example 5 was concentrated to a solids content of 3.2% by weight using a low-consistency concentrator, then dehydrated using a medium to high consistency dehydrator, and then subjected to ink-detachment using a four-shaft kneader in the same manner as in Example 17 (finished long fiber pulp C).

<Evaluation Results>
Evaluation results are shown in Table 3 and Table 4.
A comparison of Examples 9 and 10 vs. Comparative example 8 shows that more characteristic pulps can be obtained by using the technique of the present invention as compared with Comparative example 8 omitting fractionation. Specifically, the paper obtained from a finished long fiber pulp of the present invention has lower density, higher bulkiness, and higher tear strength, and the papers obtained from finished short fiber pulps of the present invention have higher smoothness and higher air resistance, as compared with the paper obtained from the pulp of Comparative example 8.

A comparison of Examples 9-11 and 14 vs. Comparative example 8 shows that pulps and papers having a comparable level of quality to that of Comparative example 8 omitting fractionation can be obtained with lower power consumption rate and lower water consumption by incorporating again fractionated pulps.

Further, Examples 11-13 and Examples 14-16 show that pulps can be obtained with varying levels of density, strength and smoothness by incorporating a finished long fiber pulp and a finished short fiber pulp obtained by the present invention at varying ratios as compared with the pulp of Comparative example 8 omitting fractionation. Especially, this benefit is remarkable in Examples 11-13 involving cavitation.

A comparison of Examples 17-19 vs. Comparative example 9 shows that fiber fractionation under conditions outside the scope of the present invention is disadvantageous because electric power consumption increases and therefore the production cost increases.

TABLE 3

|  |  | Freeness CSF ml | Ash content % | Adhesive contaminants #/kg | Integral power consumption rate kwh/t | Maximum water consumption (m³/t) |
|---|---|---|---|---|---|---|
| Example 9 | Finished long fiber A | 466 | 1.3 | 647 | 44 | 27 |
|  | Finished short fiber A | 167 | 5.5 | 43 | 136(181) | 66(93) |
| Example 10 | Finished short fiber B | 198 | 6.5 | 64 | 89(133) | 66(93) |
| Example 17 | Finished long fiber B | 434 | 1.8 | 137 | 80 | 143 |
| Example 18 | Finished short fiber C | 270 | 0.3 | 71 | 92(171) | 66 |
| Example 19 | Finished short fiber D | 255 | 4.5 | 88 | 102(182) | 50 |
| Comparative example 8 | Finished conventional | 357 | 1.5 | 246 | 215 | 135 |
| Comparative example 9 | Finished long fiber C | 413 | 1.4 | 224 | 99(212) | 143 |

|  |  | Average fiber length mm | Fiber size composition (%) | | | | |
|---|---|---|---|---|---|---|---|
|  |  |  | 24 mesh on | 42 mesh on | 50 mesh on | 150 mesh on | 150 mesh pass |
| Example 9 | Finished long fiber A | 1.10 | 30.4 | 26.9 | 22.0 | 6.9 | 13.7 |
|  | Finished short fiber A | 0.91 | 14.9 | 29.5 | 22.4 | 7.7 | 25.5 |
| Example 10 | Finished short fiber B | 0.92 | 15.4 | 29.9 | 24.0 | 8.4 | 22.4 |
| Example 17 | Finished long fiber B | 1.07 | 19.8 | 28.7 | 29.8 | 11.8 | 9.9 |
| Example 18 | Finished short fiber C | 0.92 | 13.6 | 32.7 | 22.8 | 7.7 | 23.2 |
| Example 19 | Finished short fiber D | 0.93 | 13.8 | 32.8 | 23.0 | 7.4 | 23.0 |
| Comparative example 8 | Finished conventional | 0.97 | 21.2 | 31.3 | 24.7 | 8.4 | 15.9 |
| Comparative example 9 | Finished long fiber C | 0.99 | 23.8 | 35.0 | 27.2 | 8.4 | 5.6 |

※The values in the parentheses represent integrated values when the finished long fiber pulp and the finished short fiber pulp are blended at the fractionation ratio.

TABLE 4

|  |  | Long fiber % | Short fiber % | Density g/cm³ | Breaking length km | Specific tensile strength mN/g/m² |
|---|---|---|---|---|---|---|
| Example 9 | Finished long fiber A | 100 | 0 | 0.50 | 3.9 | 10.7 |
|  | Finished short fiber A | 0 | 100 | 0.55 | 4.3 | 8.3 |
| Example 10 | Finished short fiber B | 0 | 100 | 0.54 | 4.1 | 8.1 |
| Example 11 | Long fiber A + | 20 | 80 | 0.54 | 4.4 | 8.5 |
| Example 12 | short fiber A | 50 | 50 | 0.53 | 4.5 | 9.9 |

TABLE 4-continued

| | | | | | | |
|---|---|---|---|---|---|---|
| Example 13 | | 70 | 30 | 0.53 | 4.5 | 10.1 |
| Example 14 | Long fiber A + | 20 | 80 | 0.54 | 4.0 | 8.4 |
| Example 15 | short fiber B | 50 | 50 | 0.52 | 3.9 | 8.9 |
| Example 16 | | 70 | 30 | 0.52 | 4.0 | 9.2 |
| Comparative example 8 | Finished conventional | Unfractionated | | 0.53 | 4.1 | 9.1 |

| | | Smoothness sec | Air resistance sec | Brightness % | Ink levels PPM | Number of dirt particles #/m$^2$ |
|---|---|---|---|---|---|---|
| Example 9 | Finished long fiber A | 26 | 6 | 58.7 | 238 | 2,400 |
| | Finished short fiber A | 79 | 80 | 56.8 | 469 | 680 |
| Example 10 | Finished short fiber B | 68 | 51 | 54.5 | 665 | 1,200 |
| Example 11 | Long fiber A + | 63 | 68 | 56.6 | 454 | 920 |
| Example 12 | short fiber A | 52 | 41 | 57.2 | 387 | 1,700 |
| Example 13 | | 48 | 24 | 57.5 | 352 | 1,500 |
| Example 14 | Long fiber A + | 58 | 43 | 54.0 | 615 | 1,600 |
| Example 15 | short fiber B | 45 | 23 | 55.5 | 491 | 1,900 |
| Example 16 | | 42 | 18 | 55.8 | 424 | 2,000 |
| Comparative example 8 | Finished conventional | 54 | 18 | 58.1 | 297 | 1,600 |

The invention claimed is:

1. A process for treating waste paper pulp, which process comprises fractionating a waste paper pulp slurry having a solids content of 2.2% by weight or more into a long fiber fraction and a short fiber fraction using an outward flow slit screen having openings with a slit width of 0.13 mm to 0.3 mm, wherein the solids content ratio of the long fiber fraction to the short fiber fraction is 10:90 to 60:40 and wherein the difference in Canadian standard freeness between the long fiber fraction and the short fiber fraction is 100 ml to 300 ml.

2. The process of claim 1 wherein the long fiber fraction is subjected to an ink detachment step and a contaminant removal step.

3. The process of claim 1 or 2 wherein the long fiber fraction has a solids content of 2.0% by weight or more immediately after fractionation, and wherein the fraction is dehydrated to a solids content of 25% by weight or more and then subjected to the ink detachment step and the contaminant removal step at a solids content of 0.5 to 1.2% by weight using a screen having a slit width of 0.13 to 0.2 mm.

4. The process of claim 1 wherein the long fiber fraction is not subjected to an ink removal step by flotation.

5. The process of claim 1 wherein the short fiber fraction is subjected to an ink removal step.

6. The process of claim 5 wherein the short fiber fraction is subjected to an ink detachment step at a solids content of 5% or less and then subjected to the ink removal step.

7. The process of claim 6 wherein the ink detachment step comprises bringing cavitation bubbles into contact with the pulp.

8. The process of claim 1 wherein the short fiber fraction is not subjected to a contaminant removal step using a screen.

9. A process for preparing paper comprising mixing a long fiber pulp and/or a short fiber pulp obtained by the process of claim 1 with raw materials used to prepare paper to form a mixture and forming the mixture into paper.

10. The process of claim 1, wherein the pulp has a solids content of 2.2% by weight to less than 4.0% by weight.

11. The process of claim 1 wherein the slit width of the slit screen is 0.13 mm to 0.2 mm.

12. A process for preparing recycled waste paper pulp, which process comprises fractionating a waste paper pulp slurry having a solids content of 1.5% to 2.2% by weight or more containing waste paper pulp into a long fiber fraction and a short fiber fraction using an outward flow slit screen having openings with a slit width of 0.13 mm to 0.2 mm, wherein the solids content ratio of the long fiber fraction to the short fiber fraction is 10:90 to 60:40 and wherein the difference in Canadian standard freeness between the long fiber fraction and the short fiber fraction is 100 ml to 300 ml., subjecting the short fiber fraction to an ink detachment step at a solids content of 5% or less by contacting the short fiber fraction with cavitation bubbles and then an ink removal step.

13. A process for preparing paper comprising fractionating a waste paper pulp slurry having a solids content of 1.5% to 2.2% by weight or more containing waste paper pulp into a long fiber fraction and a short fiber fraction using an outward flow slit screen having openings with a slit width of 0.13 mm to 0.2 mm, wherein the solids content ratio of the long fiber fraction to the short fiber fraction is 10:90 to 60:40 and wherein the difference in Canadian standard freeness between the long fiber fraction and the short fiber fraction is 100 ml to 300 ml., subjecting the short fiber fraction to an ink detachment step at a solids content of 5% or less by contacting the short fiber fraction with cavitation bubbles to form a treated short fiber fraction, subjecting the treated short fiber fraction to an ink removal step to form a first short fiber fraction, mixing the long fiber pulp and the first short fiber fraction with raw materials used to prepare paper to form a mixture and forming the mixture into paper.

* * * * *